United States Patent
Wu

(10) Patent No.: US 7,219,992 B1
(45) Date of Patent: May 22, 2007

(54) EYEGLASSES

(76) Inventor: Szu-Miao Wu, P.O. Box 6-9, Tainan (TW)

( * ) Notice: Subject to any disclaimer, the term of this patent is extended or adjusted under 35 U.S.C. 154(b) by 0 days.

(21) Appl. No.: 11/480,687

(22) Filed: Jul. 5, 2006

(51) Int. Cl.
*G02C 1/00* (2006.01)

(52) U.S. Cl. .......................................... 351/86; 351/83

(58) Field of Classification Search .................. 351/86, 351/83, 103, 106, 41
See application file for complete search history.

(56) References Cited

U.S. PATENT DOCUMENTS 5,971,536 A * 10/1999 Chiu ............................. 351/41
6,086,199 A * 7/2000 Holland et al. ................ 351/86
6,224,209 B1 * 5/2001 Chen ............................. 351/86

* cited by examiner

*Primary Examiner*—Hung Xuan Dang

(57) ABSTRACT

A pair of eyeglasses includes two temple pivotal bases respectively connected to the opposite sides of a lens frame, and each temple pivotal base has its front side formed with a recessed surface. Two cover-position members are respectively and pivotally assembled on the recessed surface of the temple pivotal base. The lens frame has the opposite portions near a bridge respectively provided with an arc-shaped recessed groove for fitting a lens therein. To assemble a lens on the lens frame, simply turn open the cover-position member, fit the lens in the recessed groove through the recessed surface and then close pivotally the over-position member on the recessed surface to finish assembly of the lenses.

1 Claim, 4 Drawing Sheets

EYEGLASSES

BACKGROUND OF THE INVENTION

1. Field of the Invention

This invention relates to eyeglasses, particularly to one whose lenses can be manually assembled on a lens frame by a non-professional person, needless to use any tool.

2. Description of the Prior Art

A pair of conventional eyeglasses includes a lens frame and two temples respectively having one end connected to the opposite ends of the lens frame. To inlay a lens in the lens frame, the lens frame is first heated to let its interior thermo-expanded and then the lenses are inlaid in the lens frame before the interior of the lens frame cools and shrinks. In another case, to inlay, to inlay a lens in a metal lens frame that consists of an upper and lower portion combined together, the upper and the lower portion of the metal frame are first separated and, after the lens is inlaid in the metal frame, the joint parts of the upper and the lower portion of the metal frame are locked together by a small screw.

However, these two ways of inlaying a lens in a lens frame are impossible to be done by a wearer without aid of tools. In addition, a lens frame made of thermo-plastic is likely to become deformed to make the lens fall off, and the small screw for locking the upper and the lower portion of a metal frame together may always be broken in the threaded hole, rendering the lens impossible to be fixed in place and the metal frame unable to be used any more.

SUMMARY OF THE INVENTION

The objective of the invention is to offer a pair of eyeglasses whose lens can be replaced manually by a non-professional person without using any special tool.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
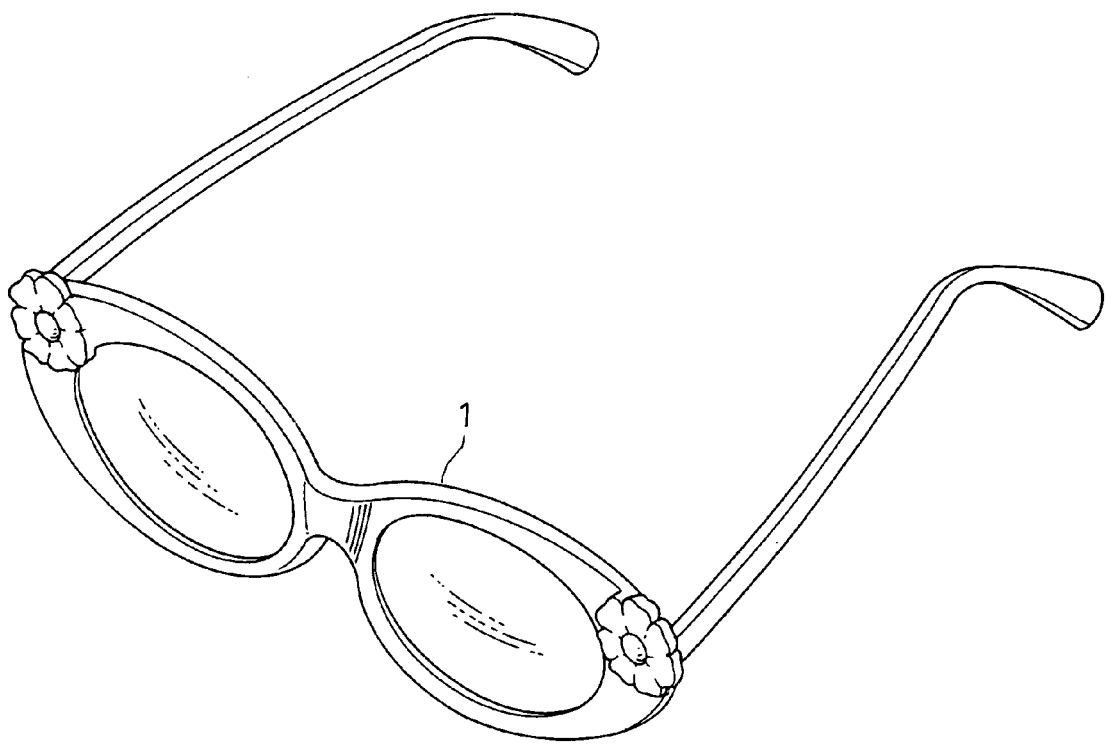
FIG. 1 is a perspective view of a pair of conventional eyeglasses.
Figure 2:
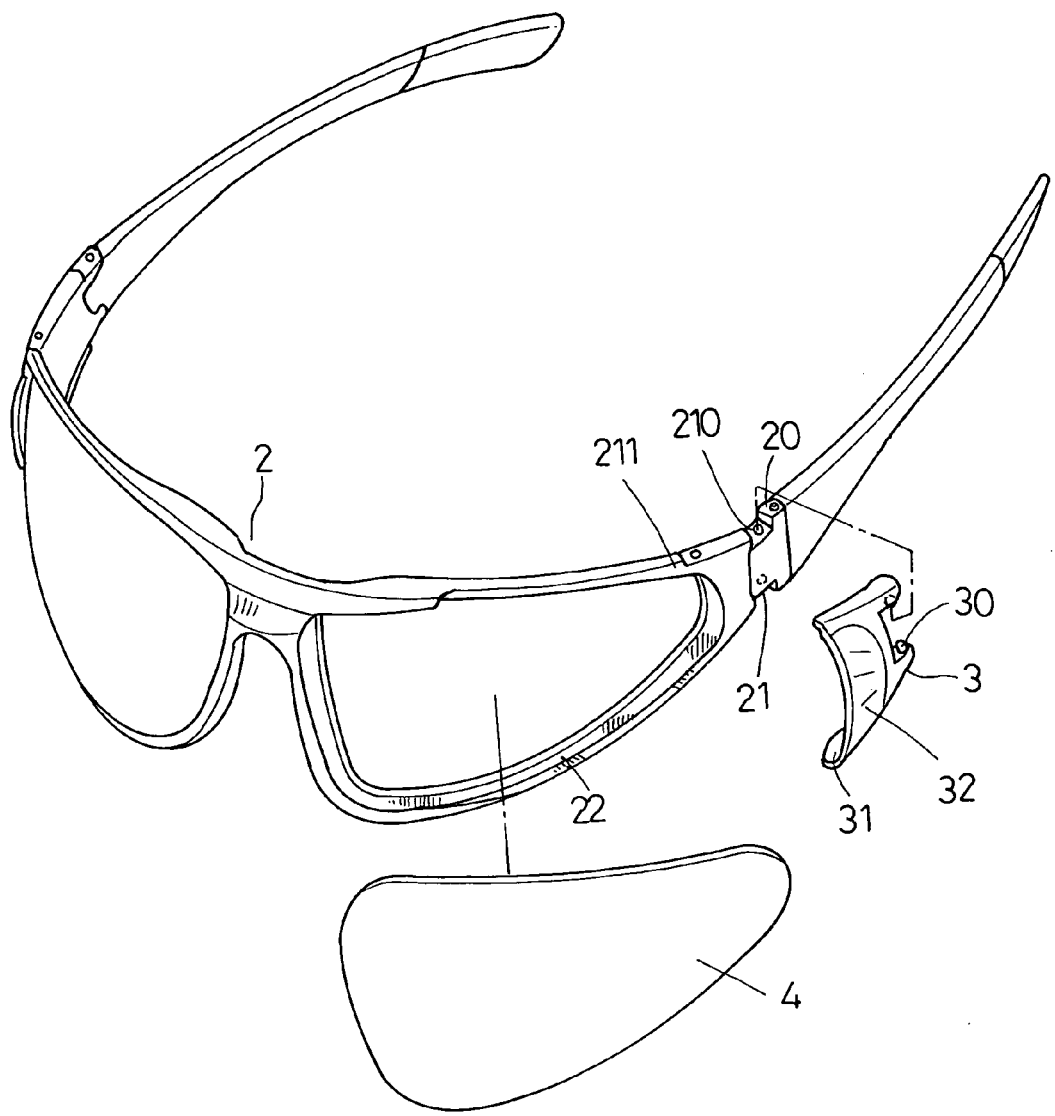
FIG. 2 is an exploded perspective view of a pair of eyeglasses in the present invention.
Figure 3:
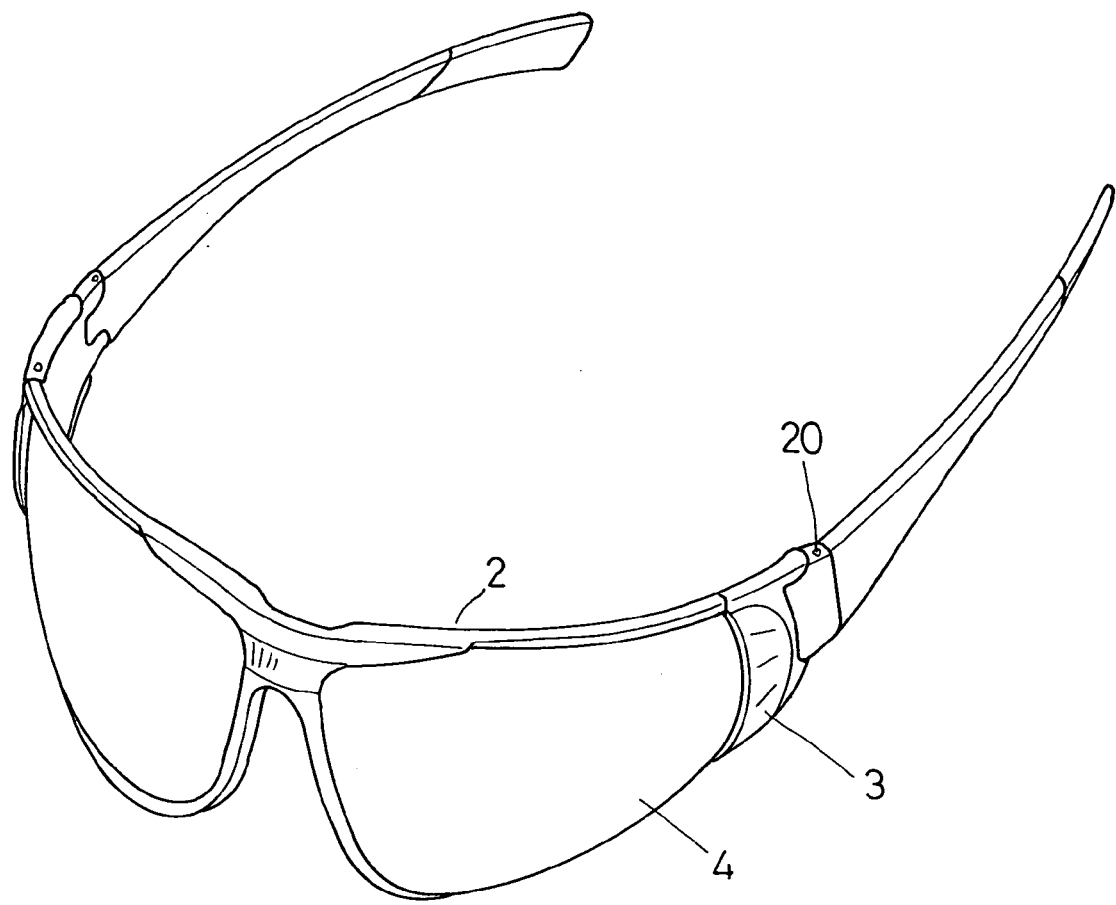
FIG. 3 is a perspective view of the pair of eyeglasses in the present invention.
Figure 4:
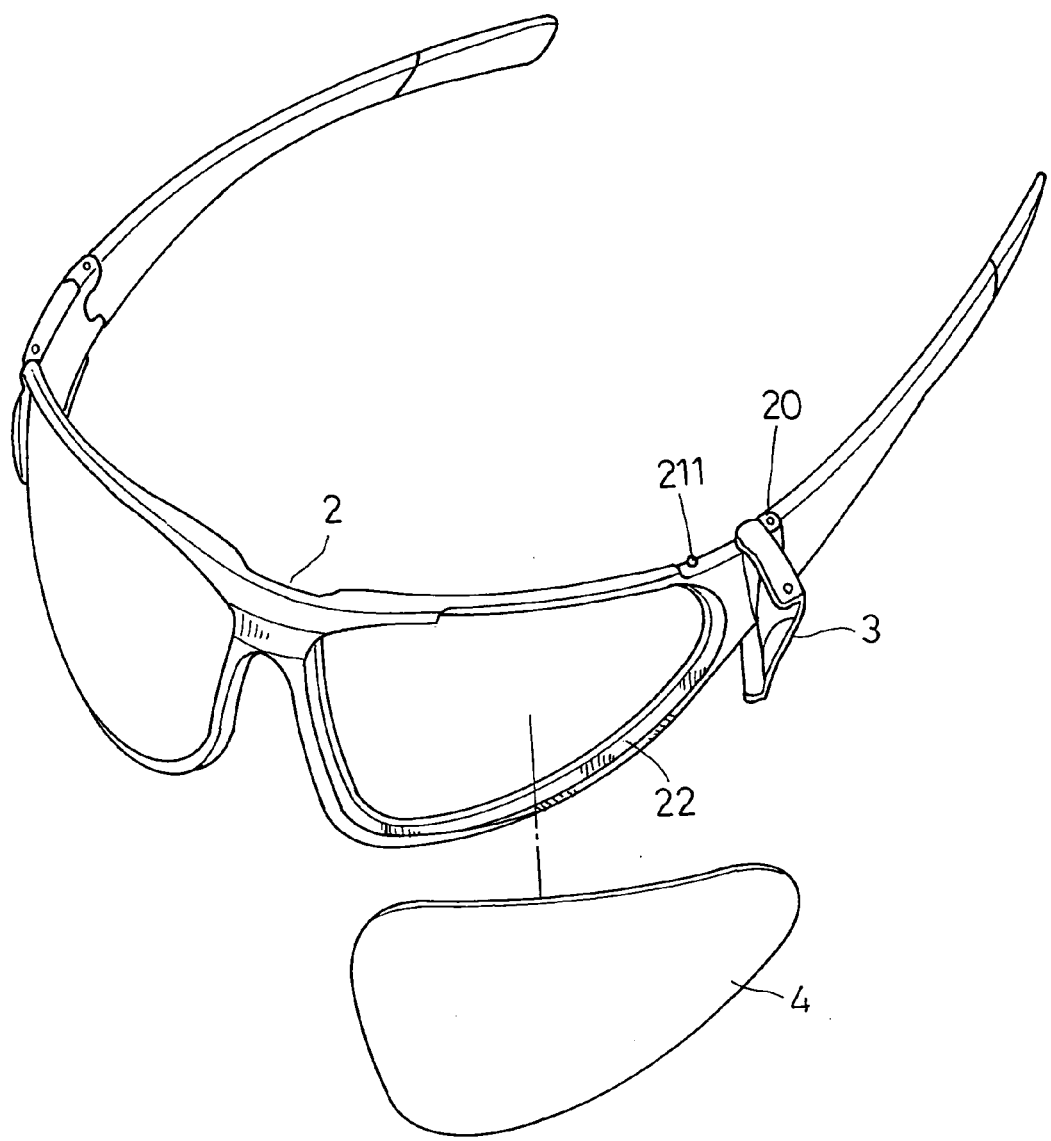
FIG. 4 is a perspective view of the pair of eyeglasses in an assembling condition in the present invention.

A preferred embodiment of eyeglasses in the present invention, as shown in FIGS. 2, 3 and 4, includes a lens frame 2, two cover-position members 3, and two lenses 4 as main components combined together.

The lens frame 2 has its opposite sides respectively provided with a temple pivotal base 20 having its front side formed with a recessed surface 21, which is provided with an engage hole 210 and a position projection 211 at the upper and the lower end. Further, the lens frame 2 has the opposite portions near a bridge respectively formed with an arc-shaped recessed groove 22.

The two cover-position members 3 respectively engaged with the engage holes 210 of the lens frame 2 has its inner side formed with an arc-shaped recessed surface and is provided with two opposite position projections 30 and two opposite engage holes 31 and further has its outer side provided with a plurality of projecting streaks 32.

The two lenses 4 are to be respectively fitted in the two recessed grooves 22 of the lens frame 2.

In assembling and using, firstly, the cover-position member 3 is turned open outward and each lens 4 is inserted in the recessed groove 22 through the recessed surface 21 of the lens frame 2 until it is fixed in position. Then, the cover-position member 3 is turned inward and covered on the temple pivotal base 20 to let its engage holes 31 respectively engaged with the two positioning projections 211 of the recessed surface 21 of the temple pivotal base 20, thus keeping the lens 4 secured stably on the lens frame 2. When the lens 4 needs to be replaced with a new one, the cover-position member 3 is turned open and disengaged from the positioning projections 211 of the temple pivotal base 20. Thus, the lens 4 can be manually removed from the lens frame 2 through the recessed surface 21 and replaced with a new lens 4.

As can be understood from the above description, this invention has the following advantages.

1. The lenses of a pair of eyeglasses can be assembled on the lens frame 2 easily and conveniently.

2. The lenses of a pair of eyeglasses can easily be assembled on the lens frame 2 only by turning open the cover-position members 3, needless to use any tool.

3. Aside from being used for positioning, the two cover-position members 3 also have a function of beautifying the lens frame, making the eyeglasses look special and original.

While the preferred embodiment of the invention has been described above, it will be recognized and understood that various modifications may be made therein and the appended claims are intended to cover all such modifications that may fall within the spirit and scope of the invention.

I claim:

1. A pair of eyeglasses comprising:

two temple pivotal bases respectively connected to the opposite sides of a lens frame, each said temple pivotal bases having its front side formed with a recessed surface, said recessed surface of said temple pivotal base having its upper and lower end respectively provided with an engage hole and a positioning projection, said lens frame having the opposite portions near a bridge respectively formed with an arc-shaped recessed groove;

two cover-position members respectively engaged with said engage holes of said recessed surface of said temple pivotal base, each said cover-position member provided with two positioning projections and two engage holes;

two lenses respectively fitted in said two recessed grooves of said lens frame; and said two lenses able to be assembled or replaced easily by means of said cover-position members that are able to be pivotally opened outward.

* * * * *